United States Patent
Liu et al.

(10) Patent No.: US 10,924,384 B2
(45) Date of Patent: Feb. 16, 2021

(54) TRAFFIC ENGINEERING FOR BORDER GATEWAY PROTOCOL

(71) Applicant: Ciena Corporation, Hanover, MD (US)

(72) Inventors: Hua Autumn Liu, San Jose, CA (US); Hossein Sahabi, San Jose, CA (US)

(73) Assignee: Ciena Corporation, Hanover, MD (US)

( * ) Notice: Subject to any disclaimer, the term of this patent is extended or adjusted under 35 U.S.C. 154(b) by 88 days.

(21) Appl. No.: 16/194,779

(22) Filed: Nov. 19, 2018

(65) Prior Publication Data
US 2020/0162365 A1  May 21, 2020

(51) Int. Cl.
| | |
|---|---|
| H04L 12/751 | (2013.01) |
| H04L 12/26 | (2006.01) |
| H04L 12/723 | (2013.01) |
| H04L 12/729 | (2013.01) |
| H04L 12/715 | (2013.01) |
| H04L 12/947 | (2013.01) |
| H04L 12/707 | (2013.01) |

(52) U.S. Cl.
CPC .......... *H04L 45/125* (2013.01); *H04L 43/022* (2013.01); *H04L 43/0894* (2013.01); *H04L 43/16* (2013.01); *H04L 45/02* (2013.01); *H04L 45/04* (2013.01); *H04L 45/22* (2013.01); *H04L 45/50* (2013.01); *H04L 49/25* (2013.01)

(58) Field of Classification Search
None
See application file for complete search history.

(56) References Cited

U.S. PATENT DOCUMENTS

| | | |
|---|---|---|
| 7,420,989 B2 | 9/2008 | Liu et al. |
| 7,508,755 B2 | 3/2009 | Liu |
| 7,697,417 B2 | 4/2010 | Chen et al. |
| 8,467,289 B2 | 6/2013 | Kini et al. |
| 8,654,681 B2 | 2/2014 | Chen et al. |

(Continued)

OTHER PUBLICATIONS

P. Mohapatra et al., BGP Link Bandwidth Extended Community, draft-ieff-idr-link-bandwidth-07.txt, Network Working Group, Internet-Draft, Intended status: Standards Track, Mar. 5, 2018 pp. 1-5.

(Continued)

*Primary Examiner* — Ajit Patel
(74) *Attorney, Agent, or Firm* — Clements Bernard Walker; Lawrence A. Baratta, Jr.; Christopher L. Bernard

(57) ABSTRACT

Systems and methods include, at a first Border Gateway Protocol (BGP) speaker node which interconnects two autonomous systems, receiving an advertisement containing available bandwidth on one or more links between the two autonomous systems from a second BGP speaker node; and, for a BGP best path calculation between the two autonomous systems at the first BGP speaker node, selecting a link of the one or more links based on the available bandwidth on the link from the advertisement. At the first BGP speaker node, the systems and methods can further include determining bandwidth on the one or more links; and transmitting an updated advertisement based on the determined bandwidth. The bandwidth can be determined based on a configurable sampling interval. The transmitted update can be provided if the determined bandwidth has changed from a previous value by more than a configurable threshold.

16 Claims, 6 Drawing Sheets

(56) References Cited

U.S. PATENT DOCUMENTS

| | | | |
|---|---|---|---|
| 8,848,578 | B2 | 9/2014 | Mukhopadhyay et al. |
| 9,807,035 | B1* | 10/2017 | Hanks .................. H04L 47/25 |
| 2002/0112077 | A1 | 8/2002 | Semaan et al. |
| 2009/0245253 | A1 | 10/2009 | Chen et al. |
| 2009/0252058 | A1 | 10/2009 | Chen et al. |
| 2009/0303904 | A1 | 12/2009 | Liu et al. |
| 2011/0090786 | A1 | 4/2011 | Liu et al. |
| 2012/0008632 | A1 | 1/2012 | Liu et al. |
| 2012/0102228 | A1* | 4/2012 | Cugini .................. H04L 45/44 709/242 |
| 2013/0286846 | A1* | 10/2013 | Atlas .................. H04L 47/726 370/236 |
| 2016/0134607 | A1 | 5/2016 | Liu |
| 2016/0191325 | A1* | 6/2016 | Pacella .................. H04L 45/04 370/254 |
| 2016/0277959 | A1* | 9/2016 | Venkataraman ...... H04L 45/125 |
| 2016/0352865 | A1* | 12/2016 | Gupta .................. H04L 67/14 |
| 2017/0034039 | A1* | 2/2017 | Yadlapalli .............. H04L 45/02 |
| 2017/0093641 | A1* | 3/2017 | Utgikar .................. H04L 41/12 |
| 2017/0104676 | A1* | 4/2017 | Patel .................. H04L 45/70 |
| 2017/0141963 | A1* | 5/2017 | Chalapathy .............. H04L 41/12 |
| 2017/0155580 | A1* | 6/2017 | Ramanujan .............. H04L 45/02 |
| 2017/0366444 | A1* | 12/2017 | Ansari .................. H04L 45/02 |
| 2018/0069780 | A1* | 3/2018 | Dhanabalan ........ H04L 43/0829 |
| 2018/0097725 | A1* | 4/2018 | Wood .................. H04L 45/42 |
| 2018/0302807 | A1* | 10/2018 | Chen .................. H04L 45/22 |
| 2019/0020738 | A1* | 1/2019 | Paul .................. H04L 45/34 |
| 2019/0036813 | A1* | 1/2019 | Shenoy .............. H04L 41/5019 |
| 2019/0097928 | A1* | 3/2019 | Chunduri ................ H04L 45/04 |
| 2019/0132232 | A1* | 5/2019 | Ammireddy .......... H04L 45/54 |
| 2019/0238457 | A1* | 8/2019 | T .......................... H04L 45/023 |

OTHER PUBLICATIONS

Y. Rekhter et al., Carrying Label Information in BGP-4, Network Working Group, Category: Standards Track, May 2001, pp. 1-8.
Y. Rekhter et al., A Border Gateway Protocol 4 (BGP-4), Network Working Group, Category: Standards Track, Jan. 2006, pp. 1-104.
P. Mohapatra et al., The Accumulated IGP Metric Attribute for BGP, Internet Engineering Task Force (IETF), Category: Standards Track, ISSN: 2070-1721, Aug. 2014, pp. 1-15.

* cited by examiner

TRAFFIC ENGINEERING FOR BORDER GATEWAY PROTOCOL

FIELD OF THE DISCLOSURE

The present disclosure generally relates to networking. More particularly, the present disclosure relates to systems and methods for Traffic Engineering (TE) for Border Gateway Protocol.

BACKGROUND OF THE DISCLOSURE

Routing protocols that have been designed to run within a single administrative domain (Interior Gateway Protocol (IGP)) generally do so by assigning a metric to each link and then choosing, as the installed path between two nodes, the path for which the total distance (sum of the metric of each link along the path) is minimized. Border Gateway Protocol (BGP), designed to provide routing over a large number of independent administrative domains, does not make its path-selection decisions through the use of a Traffic Engineering (TE) metric. BGP is a standardized exterior gateway protocol designed to exchange routing and reachability information among Autonomous Systems (AS) on the Internet. An AS is a network or a collection of networks which are managed as a single administrative domain. BGP makes routing decisions based on paths, network policies, or rule-sets configured by a network administrator and is involved in making core routing decisions. BGP may be used for routing within an AS. TE) includes optimizing the performance of a network by dynamically analyzing, predicting and regulating the behavior of data transmitted over that network. There are currently no techniques for TE in BGP.

BGP supports a Multi Exit Discriminator (MED) to influence the peer on another AS to use certain route when there are multiple entry points to that AS. This is achieved by a metric set through a route-map when the route's attribute matches certain criteria. When all other factors are equal, the path with the lowest MED value is preferred. The disadvantage of using the IVIED is that a user needs to configure certain rule(s) to classify the routes and what MED value should be used for different categorized routes. The path selected by the route is predetermined even if there is congestion on the way in the network. That is, the MED approach does not react to the dynamic changes in the network automatically, i.e., this approach does not help if the network experiences congestion.

IETF draft-ietf-idr-link-bandwidth-07 "BGP Link Bandwidth Extended Community," (Mar. 5, 2018), the contents of which are incorporated herein by reference, introduces a new link bandwidth extended community. This new extended community is used for inbound load sharing for multi-homed sites. However, the bandwidth is static total bandwidth on the link which is typically speed of the link. This approach does not consider the actual available bandwidth and therefore does not help to avoid congestion on inter-AS links. For example, even if a link is already overused, the best path could still select the path to forward traffic, leading to more congestion.

RFC 7311, "The Accumulated IGP Metric Attribute for BGP," (August 2014), the contents of which are incorporated herein by reference, describes a technique to carry accumulating IGP metrics to feed the BGP path calculation process. However, there is no Traffic Engineering metric in the picture. The BGP path selection process is not provided with the correct TE information for path selection process in the current Accumulated Interior Gateway Protocol (AIGP) scheme. The BGP best path selected based on accumulated IGP metrics does not reflect the real underlying tunnel or path used based on TE metrics.

BRIEF SUMMARY OF THE DISCLOSURE

In an embodiment, a method includes, at a first Border Gateway Protocol (BGP) speaker node that interconnects two autonomous systems, receiving an advertisement containing available bandwidth on one or more links between the two autonomous systems from a second BGP speaker node; and, for a BGP best path calculation between the two autonomous systems at the first BGP speaker node, selecting a link of the one or more links based on the available bandwidth on the link from the advertisement. The method can further include at the first BGP speaker node determining available bandwidth on the one or more links; and transmitting an updated advertisement based on the determined available bandwidth. The bandwidth can be determined based on a configurable sampling interval. The transmitted update can be provided if the determined bandwidth has changed from a previous value by more than a configurable threshold. The method can further include advertising via an Accumulated Traffic Engineering (TE) metric (ATEM) which is a transitive BGP path attribute. The advertisement can be via a Link Available Bandwidth Extended Community. The advertisement can be a BGP Traffic Engineering (TE) path attribute which is provided in a BGP UPDATE message. The advertisement can contain maximum bandwidth and available bandwidth on the one or more links. The selecting can be based on whether there is enough bandwidth or whether the available bandwidth is below a certain configurable threshold. The selecting can be for a BGP Labeled Unicast (LU) Labeled Switched Path (LSP).

In another embodiment, a Border Gateway Protocol (BGP) speaker node includes one or more ports which connect to corresponding one or more links that interconnect two autonomous systems; a switching fabric between the one or more ports; and a controller configured to obtain an advertisement containing available bandwidth on the one or more links between the two autonomous systems from a second BGP speaker node, and, for a BGP best path calculation between the two autonomous systems, select a link of the one or more links based on the available bandwidth on the link from the advertisement. The controller can be further configured to determine available bandwidth on the one or more links, and cause transmission of an updated advertisement based on the determined available bandwidth. The bandwidth can be determined based on a configurable sampling interval. The transmitted update can be provided if the determined bandwidth has changed from a previous value by more than a configurable threshold. The advertisement can be via a Link Available Bandwidth Extended Community. The advertisement can be a BGP Traffic Engineering (TE) path attribute which is provided in a BGP UPDATE message. The advertisement can contain maximum bandwidth and available bandwidth on the one or more links. The selection can be based on whether there is enough bandwidth or whether the available bandwidth is below a certain configurable threshold. The selection can be for a BGP Labeled Unicast (LU) Labeled Switched Path (LSP).

In a further embodiment, an autonomous system includes at least one Border Gateway Protocol (BGP) speaker nodes; wherein each of the at least one BGP speaker nodes are configured to provide an advertisement containing available bandwidth on one or more links connected to another autonomous system, and, for a BGP best path calculation between the autonomous system and the another autonomous system at an associated BGP speaker node, select a link of the one or more links based on the available bandwidth on the link from a corresponding advertisement from the associated BGP speaker node.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

The present disclosure relates to systems and methods for Traffic Engineering (TE) for Border Gateway Protocol. Variously, the systems and methods include a BGP Traffic Engineering (TE) path attribute which advertises the available bandwidth in an UPDATE message to a peer along with a prefix, so that the peer can make intelligent decisions based on available bandwidth of the next hop to avoid or reduce the network congestion problem. In addition to the BGP TE path attribute, the systems and methods include a BGP best path calculation where the available bandwidth or other Traffic Engineering info is taken into consideration when the best path is selected. For example, this can include determining if there is enough bandwidth available for the next hop or if the traffic flow is already at a certain percentage or threshold, the percentage and threshold can be configurable. This check can be performed at the beginning of the best path calculation or before/after any other steps of best path selection. It can also be configurable where to perform the check. The BGP TE path attribute can be via the Link Available Bandwidth Extended Community. The systems and methods can be used, for example, with BGP-Labeled Unicast (LU) and Virtual Private Networks (VPN) where Resource Reservation Protocol-Traffic Engineering (RSVP-TE) tunnels are used.

Network

Figure 1:
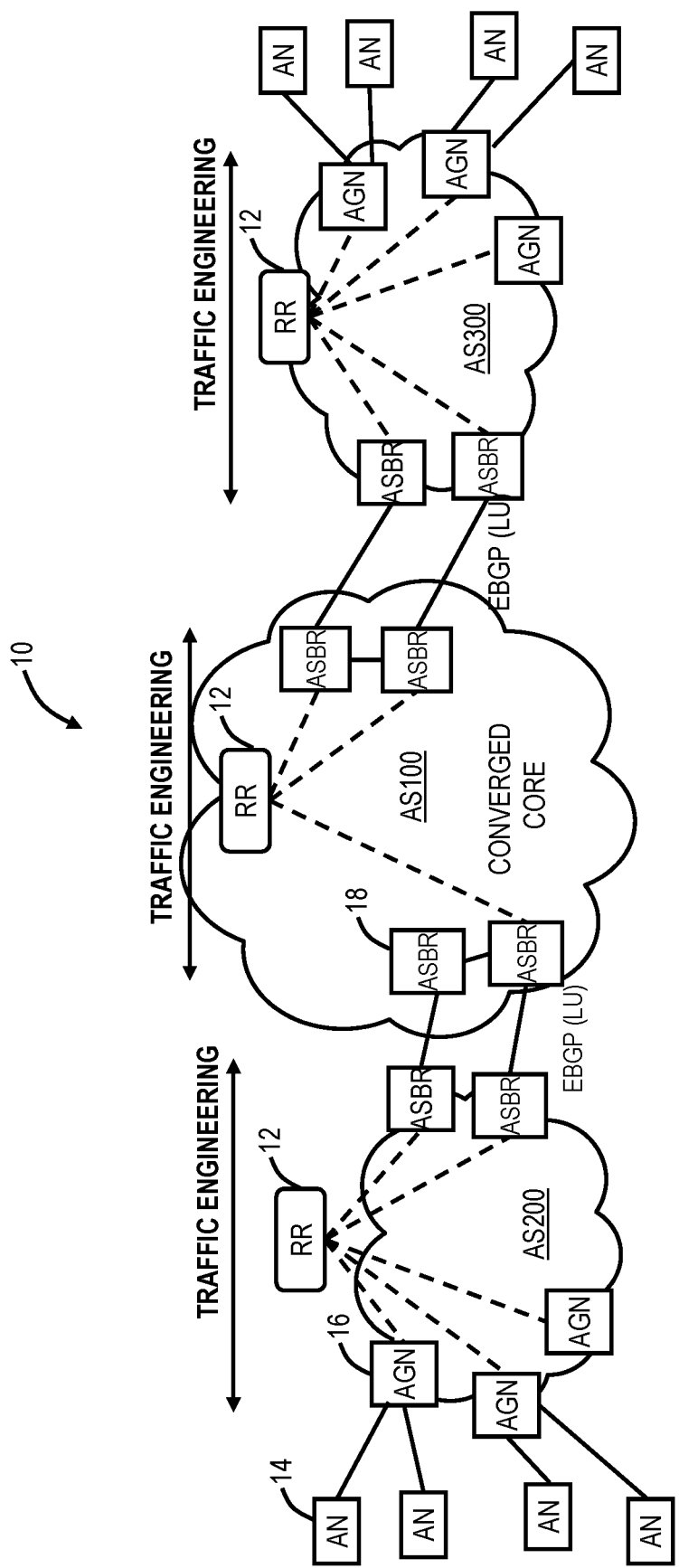
FIG. 1 is a network diagram of a Multiprotocol Label Switching (MPLS) network with three autonomous systems.

FIG. 1 is a network diagram of a Multiprotocol Label Switching (MPLS) network 10 with three autonomous systems AS100, AS200, AS300. The MPLS network 10 includes a Route Reflector (RR) 12 in each autonomous system AS100, AS200, AS300. The RRs 12 are internal BGP (iBGP) peers that propagate iBGP routes learned from other iBGP peers. The RRs 12 are used to concentrate iBGP sessions. The MPLS network 10 further includes Access Nodes (AN) 14, Aggregation Nodes (AGN) 16, and Autonomous System Boundary Routers (ASBRs) 18. The ANs 14 are nodes which process customers frames or packets at Layer 2 or above. For example, the ANs 14 can include, but are not limited to, Digital Subscriber Line Access Multiplexer (DSLAMs) or Optical Line Terminals (OLTs) in Passive Optical Networks (PON). The ANs 14 can have limited MPLS functionality in order to reduce complexity in the access network. The AGNs 16 are nodes which aggregate several ANs 14. The ASBRs 18 are routers that exchange routing information with routers belonging to other autonomous systems. Such a router advertises AS external routing information throughout the AS. The paths to each ASBR 18 is known by every router in the AS. In a seamless MPLS network, iBGP is running within each AS100, AS200, AS300 and RSVP tunnels are used to carry traffic between iBGP peers. External Border Gateway Protocol (EBGP) is running between AS domains (e.g., between AGNs 16 and ASBRs 18 or between ABSRs 18).

RSVP-TE provides robust traffic engineering end-to-end within each AS100, AS200, AS300. However, BGP has no traffic engineering concept. As a result, for end-to-end traffic between an access node traversing through multiple autonomous systems AS100, AS200, AS300 the traffic engineering in RSVP-TE is not sufficient.

Figure 2:
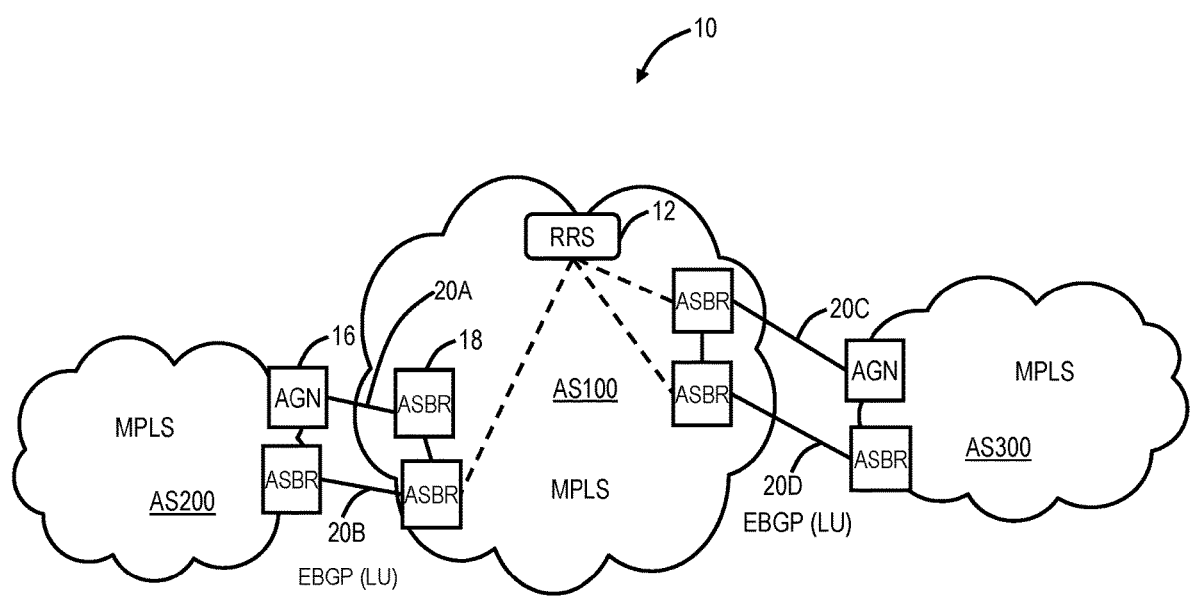
FIG. 2 is a network diagram of a portion of the MPLS network.

FIG. 2 is a network diagram of a portion of the MPLS network 10. Note, the MPLS network 10 includes multiple links 20A, 20B, 20C, 20D between neighboring autonomous systems AS100, AS200, AS300. For example, the autonomous systems AS100, AS200 can be connected via the links 20A, 20B and the autonomous systems AS200, AS300 can be connected via the links 20C, 20D. Note, the links 20A, 20B, 20C, 20D are illustrated between different nodes, but could be connected to the same node.

The systems and methods include a determination of (actual) bandwidth usage on the links 20A, 20B, 20C, 20D, advertisement of the bandwidth usage, and path selection based on the advertisement. For example, in the MPLS network 10, nodes can select either the link 20A, 20B for communication between the autonomous systems AS100, AS200 and either the link 20C, 20D for communication between the autonomous systems AS200, AS300. This selection can be based on the lower congestion on those links as opposed to some arbitrary configurable parameters which then overload a particular link.

The (actual) bandwidth usage on the links 20A, 20B, 20C, 20D can be communicated between EBGP ASBR 18 nodes. The actual bandwidth can be derived by sampling the bandwidth at an interface level and updating the advertisement in EBGP when link utilization is changed (up or down), and the change is at a certain pre-defined level. In this manner, the bandwidth advertisement is not constantly changed, but only when there is a larger difference in bandwidth utilization.

BGP TE Path Attribute

BGP-Labeled Unicast (BGP-LU) is a Label Distribution Protocol (LDP) described, for example, in RFC 3107, "Carrying Label Information in BGP-4," (May 2001), the contents of which are incorporated herein by reference. When BGP is used to distribute a particular route, it can also be used to distribute an MPLS label that is mapped to that route. The label mapping information for a particular route is piggybacked in the same BGP UPDATE message that is used to distribute the route itself. The BGP UPDATE message is described, for example, in RFP 4271, "A Border Gateway Protocol 4 (BGP-4)," (January 2006), the contents of which are incorporated herein by reference. BGP-LU does not have a traffic engineering scheme which is accounted for in route updates.

Again, IETF draft-ietf-idr-link-bandwidth-07.txt outlines a new scheme for Link Bandwidth Extended Community, where the total bandwidth of ASBR links 20A, 20B, 20C, 20D to a neighboring autonomous system are carried. However, this is the total bandwidth of the link 20A, 20B, 20C, 20D and not the actual bandwidth considering the actual traffic rate through them. The Extended Community is optional and non-transitive. The format of the AS-specific extended community is as follows:

| Type (0x40) | Extended Type (0x04) | Global Admin subfield (AS) Link Bandwidth |
|---|---|---|

When a BGP speaker receives a route from an external neighbor and advertises this route (via IBGP) to internal neighbors, as part of this advertisement the router may carry the cost to reach the external neighbor. The cost can be either configured per neighbor or derived from the bandwidth of the link that connects the router to a directly connected external neighbor. This value is carried in the Link Bandwidth Extended Community. The nodes 16, 18 forming the links 20A, 20B, 20C, 20D are each BGP speakers. Note, it is common to refer to these nodes as BGP speakers rather than routers or nodes. A device which is running BGP is called a BGP speaker, and two BGP speakers that form a BGP connection for the purpose of exchanging routing information are called BGP peers or neighbors.

The value of the high-order octet of the extended Type Field is 0x40. The value of the low-order octet of the extended type field for this community is 0x04. The value of the Global Administrator subfield in the Value Field represents the autonomous system of the router that attaches the Link Bandwidth Extended Community. If four-octet AS numbering scheme is used [RFC6793], AS_TRANS is used in the Global Administrator subfield. The bandwidth of the link is expressed as 4 octets in IEEE floating point format, units being bytes per second. It is carried in the Local Administrator subfield of the Value Field.

The systems and methods utilized actual bandwidth which extends this Link Bandwidth Extended Community from static total link bandwidth to dynamic link utilization. The systems and methods can support several approaches to advertise TE related information in BGP UPDATE messages. This can include an Accumulated TE metric (ATEM) which is a transitive BGP path Attribute. The attribute type code can be determined. The Value field of the ATEM attribute can be encoded as a Type-Length-Value (TLV) as ATEM TLV—Type: TBD—Length: 11—Value Accumulated TE Metric. The Type field is one octet, the Length is 2 octet, and the Value is 8 octets and is interpreted as a 64-bit value.

The ATEM attribute can be added to the following routes: static routes, IGP routes which are redistributed to BGP, IBGP-learned route that has AS_PATH empty, IBGP learned routes that AS_PATH contains the autonomous system that is in the same admin domain of the BGP speakers and the like.

In another embodiment to the ATEM, a BGP TE path attribute can have the following format and attributes:

> Flags (1 byte)
> Type (TBD) (1 byte)
> Length (1 byte)
> Length if extended length bit is set (1 byte)
> TE-metric (4 bytes)
> Maximum Bandwidth (4 bytes)
> Available Bandwidth (4 bytes)

The TE metric can be configured by the network administrator. The maximum bandwidth is a value of the bandwidth can be used on this Label Switched Path (LSP), in IEEE floating point format, and the units are bytes per second. The available bandwidth is the amount of bandwidth not yet used, in IEEE floating point format, and the units are bytes per second. Those skilled in the art will recognize other formats are contemplated which convey actual bandwidth such that a path selection can decide which link 20 to use based on congestion.

Bandwidth Determination

When a BGP speaker advertises a route to its peer, it adds maximum bandwidth and available bandwidth as the TE attribute to the path. The available bandwidth is determined by underlying MPLS tunnel usage when the tunnel is used. If the tunnel is not used, the direct link bandwidth usage is used. When a BGP speaker receives the route update with TE attribute, it can compare this information with other candidate paths. If the available bandwidth is comparable low or much of the bandwidth on this next hop is already taken, then this path is not preferred.

Link Bandwidth can be defined through a sampling scheme where sampling intervals and several associated parameters are configurable. If there are bandwidth usage changes and the change is above the certain threshold, an update message with updated BGP extended community is sent to the peer so that the peer node can take action to avoid further congestion on the network.

The AGN 16 node, the ABSR 18 node, etc. can be referred to as a "node" herein. The node can include a Performance Monitoring (PM) infrastructure collecting statistics from each LSP (tunnels) for various nodes (ingress, egress, and transit nodes). For example, a Utilization based Auto-sizing PM can read the statistics for each tunnel on a configurable sample interval. This concept that is used for auto-sizing the tunnels can be extended to advertising total leftover link bandwidth after few sample intervals are different from the previously advertised value.

Accumulated TE Metric Process

There could be a configuration parameter to enable or disable the accumulated TE metric collection on per neighbor and per address family basis when there is a need. When BGP path next hop is resolved on a TE tunnel, and the accumulated TE metric collection is enabled, a new accumulated TE metric attribute is added with a TE metric if this is an initiating node, or the received update message does not have this attribute. If the received update message already has the attribute, and the accumulated TE metric collection is enabled, the attribute is updated with the sum of adding the current TE metric to the received value. If the accumulated TE metric collection is not enabled, or the next hop is not resolved on the TE LSP, the attribute will be removed from the update message sending out further. The accumulated TE metric attribute will be used on the best path selection process so that a preferred path will be taken. This new accumulated TE metric attribute is advertised along with the update message to its peer. In the systems and methods, the advertisement is no longer based on the statically configured parameters, and real traffic data is used for selecting appropriate inter-AS routes.

Figure 3:
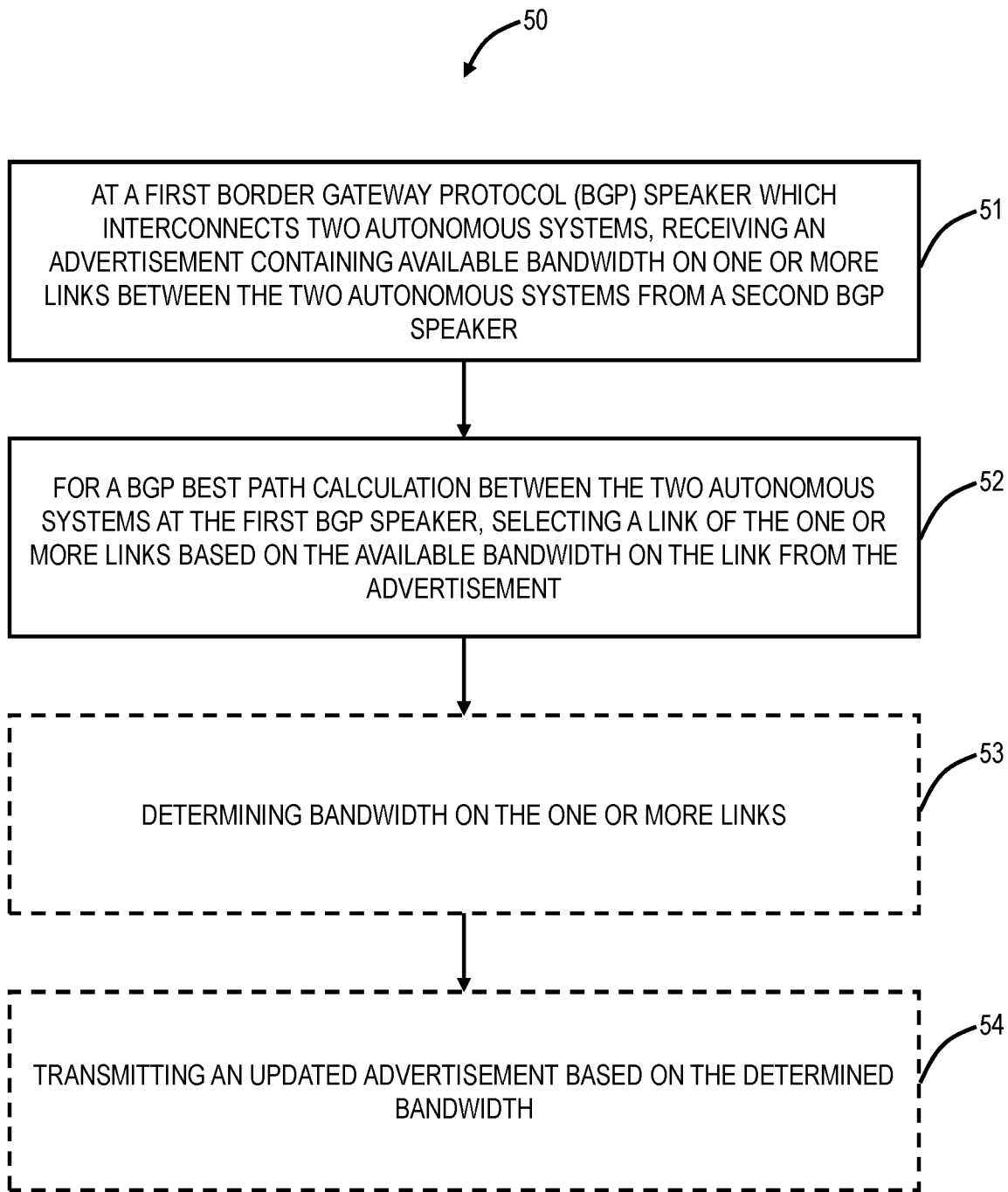
FIG. 3 is a flowchart of an accumulated TE metric process implemented at a node between two autonomous systems.

FIG. 3 is a flowchart of an accumulated TE metric process 50 implemented at a node between peers within an autonomous system. The process 50 includes, at a first Border Gateway Protocol (BGP) speaker which interconnects two autonomous systems, receiving an advertisement containing available bandwidth on one or more links between the two autonomous systems from a second BGP speaker (step 51); and, for a BGP best path calculation between the two autonomous systems at the first BGP speaker, selecting a link of the one or more links based on the available bandwidth on the link from the advertisement (step 52). The process 50 can further include at the first BGP speaker determining bandwidth on the one or more links (step 53); and transmitting an updated advertisement based on the determined bandwidth (step 54).

The bandwidth can be determined based on a configurable sampling interval. The transmitted update can be provided if the determined bandwidth has changed from a previous value by more than a configurable threshold. The advertisement can be via a Link Available Bandwidth Extended Community. The advertisement can be a BGP Traffic Engineering (TE) path attribute which is provided in a BGP UPDATE message. The advertisement can contain maximum bandwidth and available bandwidth on the one or more links. The selecting can be based on whether there is enough bandwidth or whether the available bandwidth is below a certain configurable threshold. The selecting can be for a BGP Labeled Unicast (LU) Labeled Switched Path (LSP).

A decision process at the first BGP speaker can include if any path (one or more links) has an ATEM attribute containing an ATEM TLV, remove from consideration all paths that do not have an ATEM attribute containing an ATEM TLV. If router R is considering path T, where T has an ATEM attribute with an ATEM TLV, then R must compute the value A, defined as follows: set A to the sum of (a) T's ATEM TLV value and (b) the TE metric from R to T's next hop, and remove from consideration all routes that are not tied for the lowest value of A.

Example Path Calculation

Figure 4:
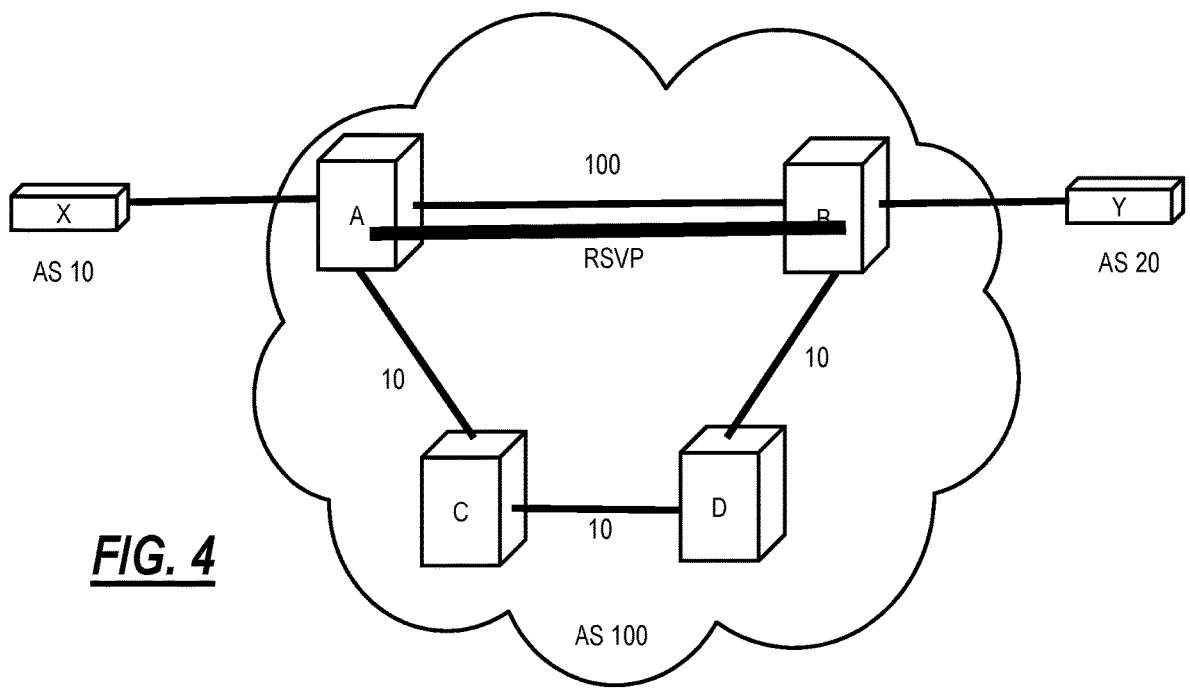
FIG. 4 is a network diagram of an autonomous system AS100 illustrating a TE bandwidth update.

FIG. 4 is a network diagram of an autonomous system AS100 illustrating a TE bandwidth update. Again, the systems and methods communicate TE-related information between BGP speakers and change the existing BGP best path calculation to select the best path for BGP prefix based on the TE information. In FIG. 4, the tunnel between nodes A, B, if it is configured with 100G maximum bandwidth and the actually utilized bandwidth is only 10G, 90G can be used for remaining bandwidth to influence the route selection. TE updates are generated by node A to bode X to influence the route selection process based on real traffic data as opposed to some arbitrary static configuration. In conventional approaches, link metrics are only meaningful for Internet Protocol (IP) routing and not RSVP paths, and therefore using IGP metrics will be misleading. In FIG. 4, the RSVP path takes nodes A, B instead of the smaller metric path of nodes A, C, D, B. Therefore, using a metric of 30 for BGP-LU advertisement for the nodes A, C, D, B, is actually wrong.

Figure 5:
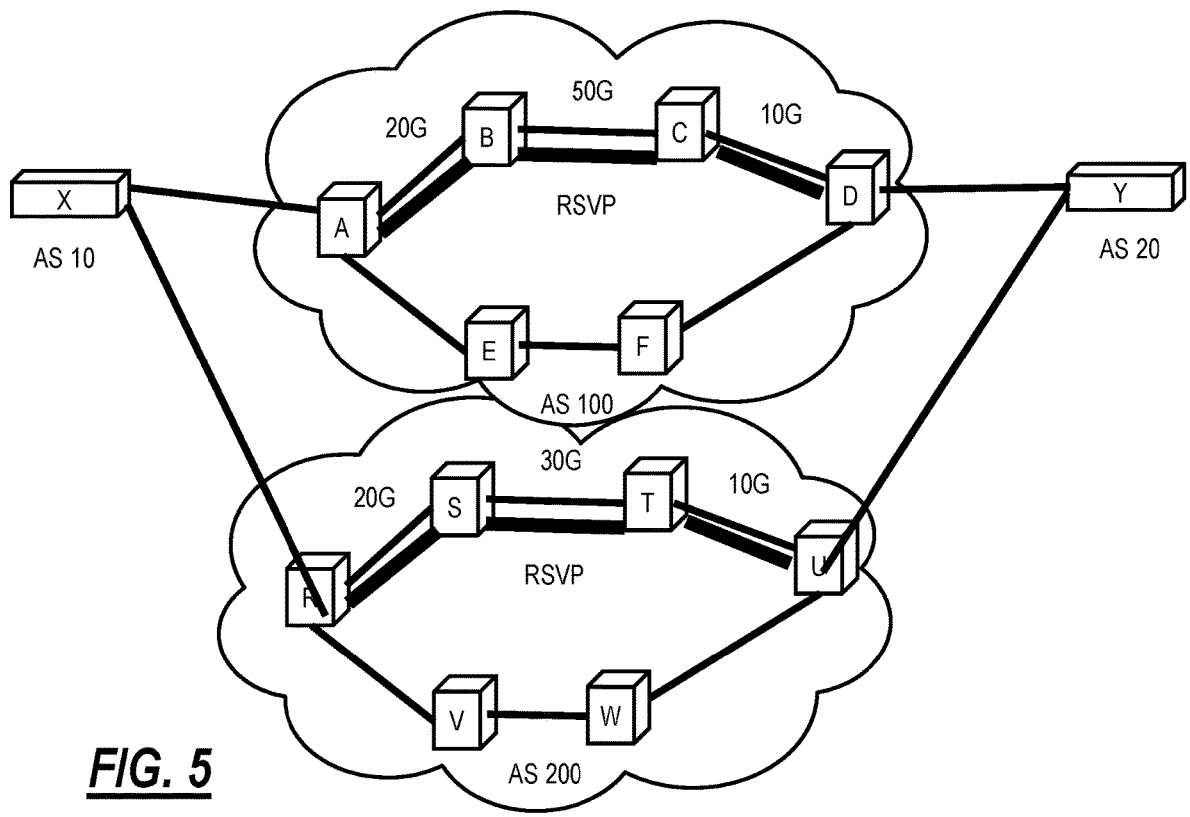
FIG. 5 is a network diagram of autonomous systems AS100, AS200 for TE metrics.

FIG. 5 is a network diagram of autonomous systems AS100, AS200 for TE metrics. In a generic case with multiple autonomous systems, without providing TE information to BGP, route selection chooses the routes and potentially could overwhelm a particular path while other less congested paths are available. A path includes multiple links, and they have varying link TE metrics, ATEM metric can be populated as the sum of all links' metrics through which this LSP is going through. In FIG. 5, the ATEM for AS100 is metric is set to 80 (sum of the links between the nodes A, B, C, D, while for AS200 is set to 60 (sum of the links between the nodes R, S, T, U). In this way, the systems and methods influence the EBGP routing decision to route the traffic between nodes X, Y to AS200.

FIG. 5 illustrates a topology of a typical seamless MPLS deployment scenario where nodes X, Y are BGP speakers on autonomous system AS10, nodes A, D, R, U are BGP speakers on autonomous system AS20, node X is multi-homed to node A, R, node Y is multi-home to node D, U. A BGP LU LSP can be established between nodes X, Y via nodes A, R. When Equal-cost multi-path routing (ECMP) is not used, node X will only select one best path via nodes A or R to reach node Y. The best path selection is based on various BGP attributes including weight, metric, etc. These attributes are set based on a static configuration without the systems and methods. If the selection chooses node A as the next hop, when the paths between nodes A-D get congested, the new BGP LU LSP will continue selecting the same path via node A because node X does not make decision-based on available bandwidth which could be dynamically changed. This leads [to] more congestion on the network.

The TE based behavior in Seamless MPLS can be detected by metrics that is injected into the EBGP route selection process. The existing metrics are all IPv4 based, while based on the new scheme described herein, the metric is calculated based on the MPLS path selected and bandwidth associated with the path. These metrics are usually available through Command Line Interface (CLI) commands and can be verified its calculation logic. The TE based behavior in Seamless MPLS can also be detected by verifying BGP advertisement based on traffic patterns on Inter-AS links. Based on the steady increase or decrease of the bandwidth (not necessarily short bursts), BGP advertisement is changed. Without the proposed solution here, BGP advertisement does not change.

Node

Figure 6:
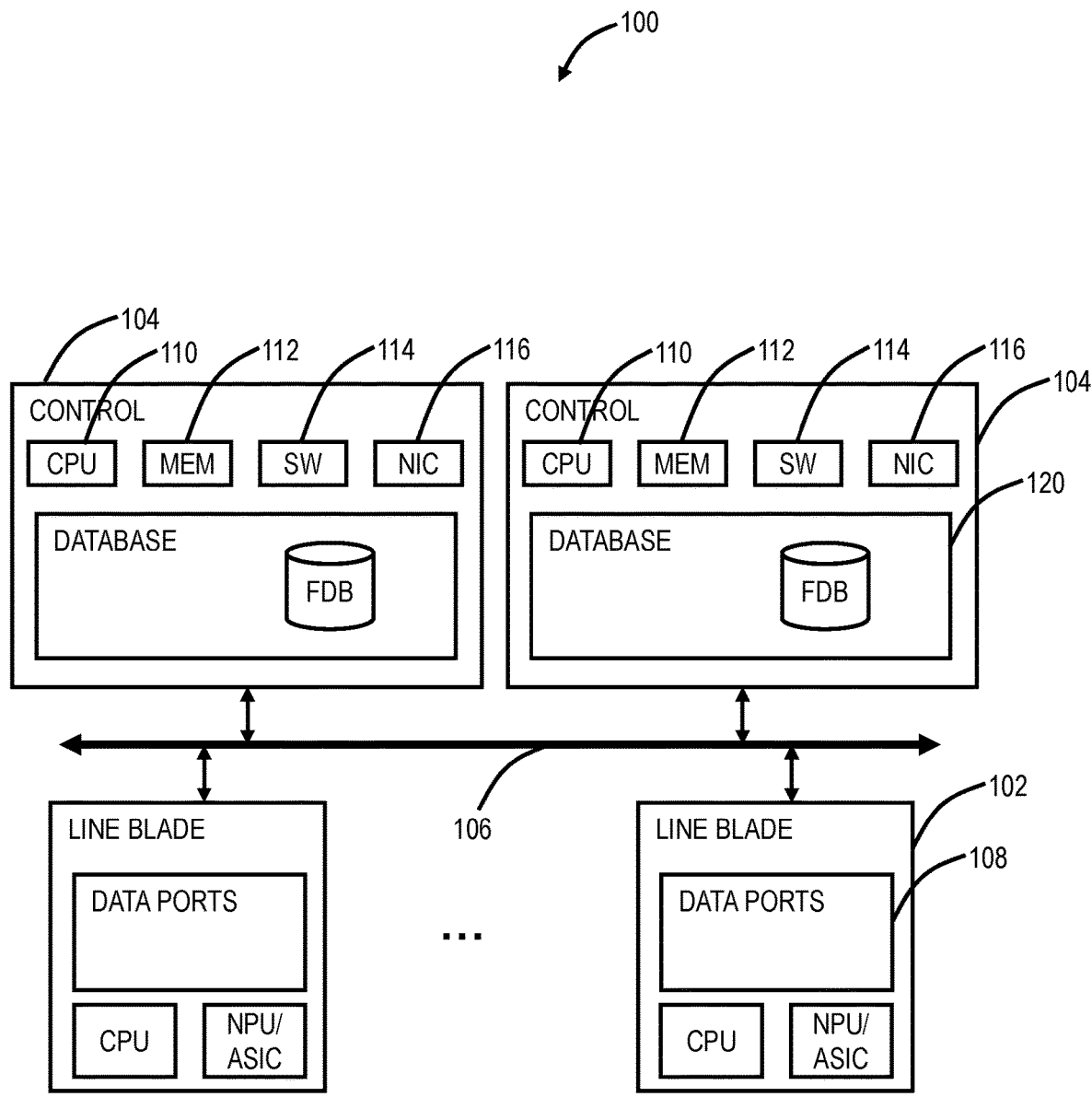
FIG. 6 is a block diagram of an implementation of a node.

FIG. 6 is a block diagram of an implementation of a node 100. In this embodiment, the node 100 is an Ethernet network switch, but those of ordinary skill in the art will recognize the systems and methods described herein can operate with other types of network elements and other implementations. In this embodiment, the node 100 includes a plurality of blades 102, 104 interconnected via an interface 106. The blades 102, 104 are also known as line cards, line modules, circuit packs, pluggable modules, etc. and generally refer to components mounted on a chassis, shelf, etc. of a data switching device, i.e., the node 100. Each of the blades 102, 104 can include numerous electronic devices and optical devices mounted on a circuit board along with various interconnects including interfaces to the chassis, shelf, etc.

Two example blades are illustrated with line blades 102 and control blades 104. The line blades 102 include data ports 108 such as a plurality of Ethernet ports. For example, the line blade 102 can include a plurality of physical ports disposed on an exterior of the blade 102 for receiving ingress/egress connections. Additionally, the line blades 102 can include switching components to form a switching fabric via the interface 106 between all of the data ports 108 allowing data traffic to be switched between the data ports 108 on the various line blades 102. The switching fabric is a combination of hardware, software, firmware, etc. that moves data coming into the node 100 out by the correct port 108 to the next node 100. "Switching fabric" includes switching units in a node; integrated circuits contained in the switching units; and programming that allows switching paths to be controlled. Note, the switching fabric can be distributed on the blades 102, 104, in a separate blade (not shown), or a combination thereof. The line blades 102 can include an Ethernet manager (i.e., a processor) and a Network Processor (NP)/Application Specific Integrated Circuit (ASIC).

The control blades 104 include a microprocessor 110, memory 112, software 114, and a network interface 116. Specifically, the microprocessor 110, the memory 112, and the software 114 can collectively control, configure, provision, monitor, etc. the node 100. The network interface 116 may be utilized to communicate with an element manager, a network management system, etc. Additionally, the control blades 104 can include a database 120 that tracks and maintains provisioning, configuration, operational data and the like. The database 120 can include a Forwarding Database (FDB) that may be populated as described herein (e.g., via the user triggered approach or the asynchronous approach). In this embodiment, the node 100 includes two control blades 104 which may operate in a redundant or protected configuration such as 1:1, 1+1, etc. In general, the control blades 104 maintain dynamic system information including Layer two forwarding databases, protocol state machines, and the operational status of the ports 108 within the node 100.

Figure 7:
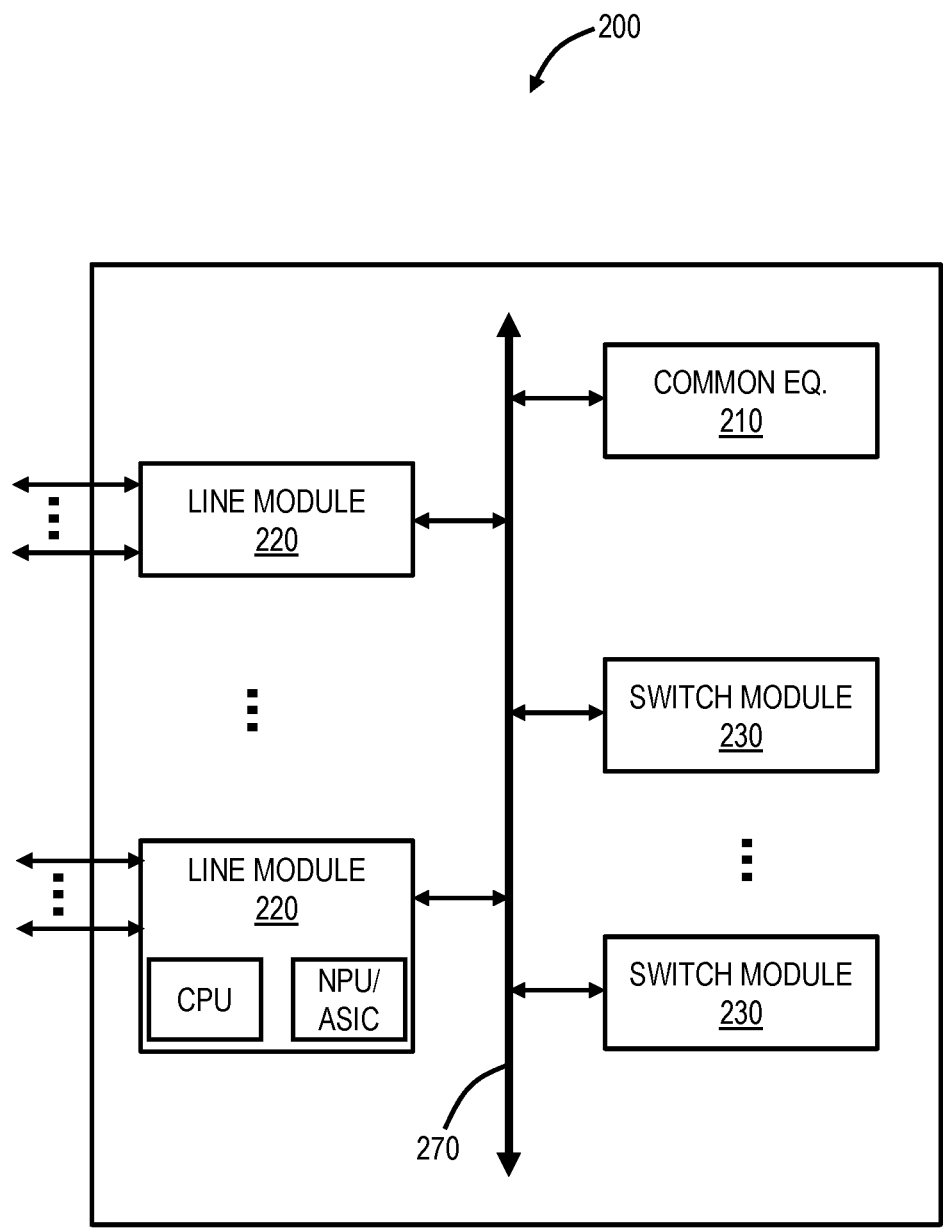
FIG. 7 is a block diagram of another implementation of a node.

FIG. 7 is a block diagram of another implementation of a node 200. For example, the node 100 can be a dedicated switch whereas the node 200 can be a multiservice platform. In an embodiment, the node 200 can be a nodal device that may consolidate the functionality of a multi-service provisioning platform (MSPP), digital cross-connect (DCS), Ethernet and Optical Transport Network (OTN) switch, dense wave division multiplexed (DWDM) platform, etc. into a single, high-capacity intelligent switching system providing Layer 0, 1, and 2 consolidation. In another embodiment, the node 200 can be any of an add/drop multiplexer (ADM), a multi-service provisioning platform (MSPP), a digital cross-connect (DCS), an optical cross-connect, an optical switch, a router, a switch, a WDM terminal, an access/aggregation device, etc. That is, the node 200 can be any system with ingress and egress signals and switching of packets, channels, timeslots, tributary units, wavelengths, etc. In the context of the systems and methods described herein, the node 200 includes packet switching with metering in addition to any other functionality.

In an embodiment, the node 200 includes common equipment 210, one or more line modules 220, and one or more switch modules 230. The common equipment 210 can include power; a control module; operations, administration, maintenance, and provisioning (OAM&P) access; and the like. The common equipment 210 can connect to a management system such as a network management system (NMS), element management system (EMS), or the like. The node 200 can include an interface 270 for communicatively coupling the common equipment 210, the line modules 220, and the switch modules 230 together. For example, the interface 270 can be a backplane, midplane, a bus, optical or electrical connectors, or the like. The line modules 220 are configured to provide ingress and egress to the switch modules 230 and external to the node 200. In an embodiment, the line modules 220 can form ingress and egress switches with the switch modules 230 as center stage switches for a three-stage switch, e.g., a three-stage Clos switch.

The line modules 220 can include a plurality of connections per module and each module may include a flexible rate and protocol support for any type of connection, such as, for example, 155 Mb/s, 622 Mb/s, 1 Gb/s, 2.5 Gb/s, 10 Gb/s, 40 Gb/s, 100 Gb/s, etc. The line modules 220 can include wavelength division multiplexing interfaces, short reach interfaces, and the like, and can connect to other line modules 220 on remote network elements, end clients, routers, switches, and the like. From a logical perspective, the line modules 220 provide ingress and egress ports to the node 200, and each line module 220 can include one or more physical ports. The switch modules 230 are configured to switch channels, timeslots, tributary units, wavelengths, etc. between the line modules 220. For example, the switch modules 230 can provide wavelength granularity (Layer 0 switching), SONET/SDH granularity; OTN granularity, etc.; Ethernet granularity; and the like. Specifically, the switch modules 230 can include both Time Division Multiplexed (TDM) (i.e., circuit switching) and packet switching engines. The switch modules 230 can include redundancy as well, such as 1:1, 1:N, etc.

In the context of the systems and methods described herein, the node 100 includes packet metering which can be performed by one or more meters, implemented in circuitry and located on the line blade 102, the control blade 104, in the switching fabric at some point, etc. Similar to the node 100, the node 200 includes packet switching through the line modules 220 and/or the switch modules 230. The node 200 includes packet metering which can be performed by one or more meters, implemented in circuitry and located on the line modules 220, the switch modules 230, the common equipment 210, etc. Specifically, the process 50 can be implemented in circuitry, logic, hardware, firmware, software, and/or a combination thereof in the nodes 100, 200. Those of ordinary skill in the art will recognize the nodes 100, 200 can include other components that are omitted for illustration purposes, and that the systems and methods described herein contemplate using a plurality of different nodes with the nodes 100, 200 presented as an example type of node. For example, in another embodiment, a node may not include the switch modules 230, but rather have the corresponding functionality in the line modules 220 (or some equivalent) in a distributed fashion. For the nodes 100, 200, other architectures providing ingress, egress, and switching are also contemplated for the systems and methods described herein. In general, the systems and methods described herein contemplate use with any node providing BGP.

The nodes 100, 200 can include a PM infrastructure with a Threshold Crossing Alert (TCA) infrastructure that determines a TCA crossing which is the trigger for Auto-sizing. This infrastructure can be used for configuring various attributes of statistics collection at the port/interface level and for collecting port/interface statistics per sample interval.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method, implemented at a first Border Gateway Protocol (BGP) speaker node of a first autonomous system, the method comprising:
   receiving an advertisement having information pertaining to available bandwidth on one or more links between the first autonomous system and a second autonomous system, the advertisement received from a second BGP speaker node of the second autonomous system;
   performing a BGP best path calculation between the first and second autonomous systems at the first BGP speaker node, by selecting a link from the one or more links, wherein selecting the link is based on the available bandwidth and real traffic data on the one or more links;
   determining updated available bandwidth on the one or more links; and
   transmitting an updated advertisement to the second BGP speaker node based on the determined updated available bandwidth, wherein the updated advertisement is transmitted it the determined updated available bandwidth has changed from a previous value by more than a configurable threshold.

2. The method of claim 1, wherein the determined updated available bandwidth is determined based on a configurable sampling interval.

3. The method of claim 1, further comprising advertising via an Accumulated Traffic Engineering (TB) metric (ATEM) which is a transitive BOP path attribute.

4. The method of claim 1, wherein the advertisement is received via a Link Available Bandwidth Extended Community.

5. The method of claim 1, wherein the advertisement is a BOP Traffic Engineering (TE) path attribute which is provided in a BGP UPDATE message.

6. The method of claim 1, wherein the advertisement has information pertaining to a maximum bandwidth and available bandwidth on the one or more links.

7. The method of claim 1, wherein the selecting is based on whether there is enough bandwidth or whether the available bandwidth is below a certain configurable threshold.

8. The method of claim 1, wherein the selecting is for a BGP Labeled Unicast (LU) Labeled Switched Path (LSP).

9. A Border Gateway Protocol (BOP) speaker node of a first autonomous system, the BGP speaker node comprising:
   one or more ports which connect to corresponding one or more links that interconnect two autonomous systems;
   a switching fabric between the one or more ports; and
   a controller configured to
   obtain an advertisement having information pertaining to available bandwidth on the one or more links between the first autonomous system and a second autonomous system, the advertisement obtained from a second BOP speaker node of the second autonomous system,
   perform a BGP best path calculation between the first and second autonomous systems by selecting a link from the one or more links, wherein selecting the link is based on the available bandwidth and real traffic data on the one or more links,
   determine updated available bandwidth on the one or more links, and
   cause transmission of an updated advertisement to the second BGP speaker node based on the determined updated available bandwidth, wherein the controller is configured to cause transmission of the updated advertisement if the determined updated available bandwidth has changed from a previous value by more than a configurable threshold.

10. The BGP speaker node of claim 9, wherein the determined updated available bandwidth is determined based on a configurable sampling interval.

11. The BGP speaker node of claim 9, wherein the advertisement is obtained via a Link Available Bandwidth Extended Community.

12. The BGP speaker node of claim 9, wherein the advertisement is a BGP Traffic Engineering (TE) path attribute which is provided in a BGP UPDATE message.

13. The BGP speaker node of claim 9, wherein the advertisement has information pertaining to a maximum bandwidth and available bandwidth on the one or more links.

14. The BGP speaker node of claim 9, wherein the selection is based on whether there is enough bandwidth or whether the available bandwidth is below a certain configurable threshold.

15. The BGP speaker node of claim 9, wherein the selection is for a BGP Labeled Unicast (LU) Labeled Switched Path (LSP).

16. An autonomous system comprising:
at least one Border Gateway Protocol (BGP) speaker node;
wherein each of the at least one BGP speaker node is configured to one or more of receive and provide an advertisement having information pertaining to available bandwidth on one or more links connected between the autonomous system and a second autonomous system, the advertisement provided to an associated BGP speaker node of the second autonomous system,
perform a BGP best path calculation between the autonomous system and the second autonomous system at the associated BGP speaker node by selecting a link from the one or more links, wherein selecting the link is based on the available bandwidth and real traffic data on the one or more links,
determine updated available bandwidth on the one or more links, and
cause transmission of an updated advertisement to the associated BGP node based on the determined updated available bandwidth, wherein the controller is configured to cause transmission of the updated advertisement if the determined updated available bandwidth has changed from a previous value by more than a configurable threshold.

* * * * *